Aug. 2, 1949.  W. H. FARR ET AL  2,477,790
BELT CONVEYER
Filed Oct. 28, 1944  6 Sheets-Sheet 3

INVENTORS
Warren H. Farr,
Carolus L. Eksergian
Clarence E. Dupont and
BY John P. Tarbox
ATTORNEY

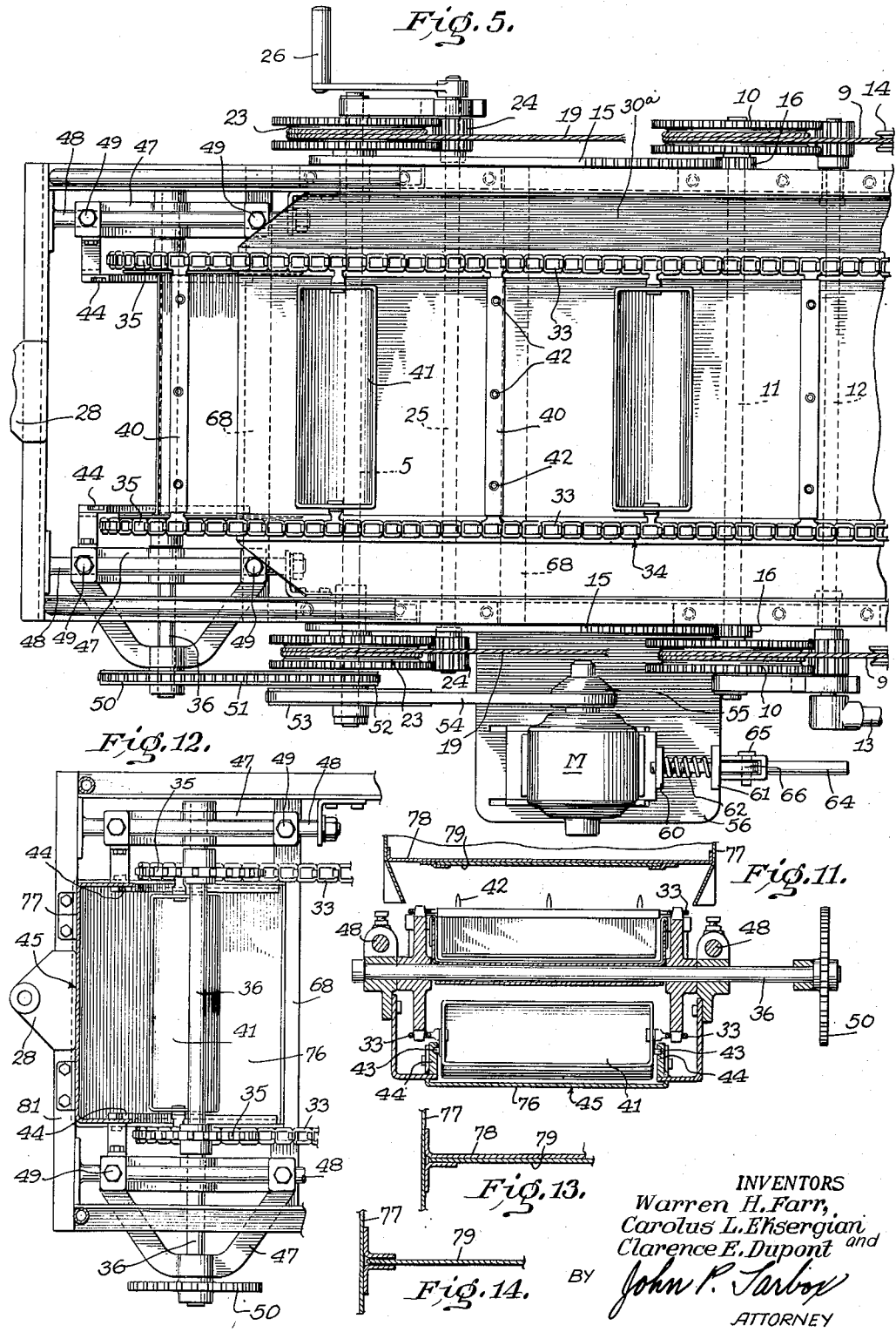

Aug. 2, 1949.  W. H. FARR ET AL  2,477,790
BELT CONVEYER
Filed Oct. 28, 1944  6 Sheets-Sheet 5
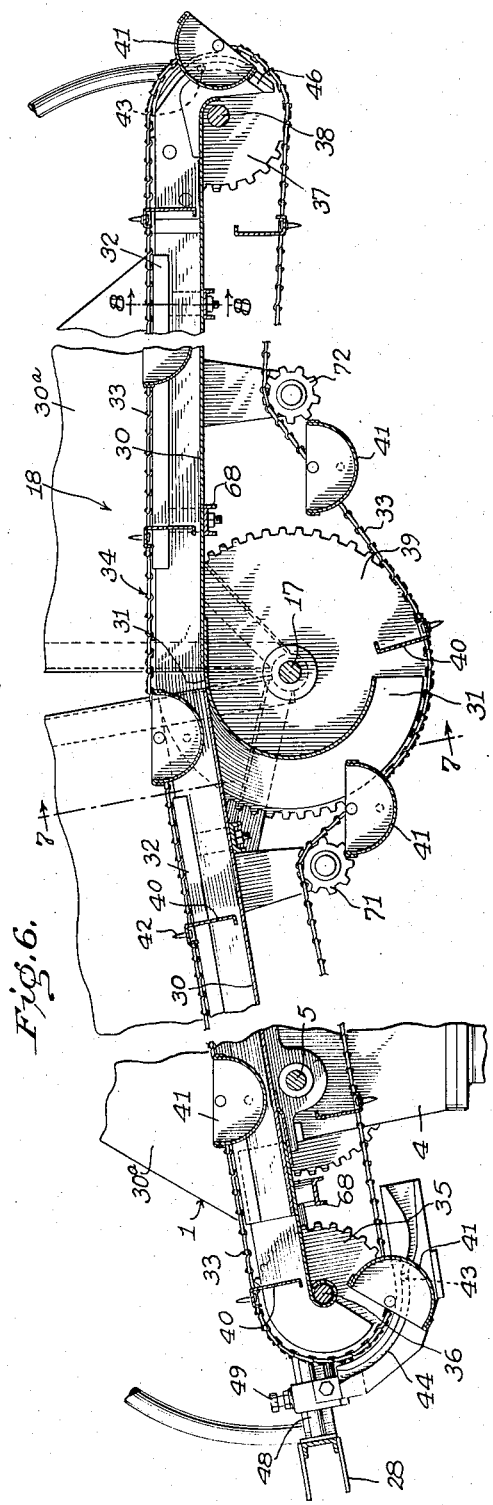
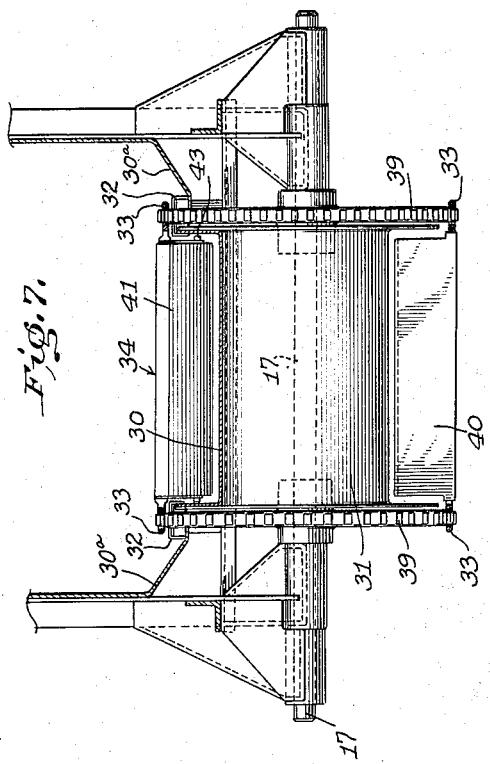
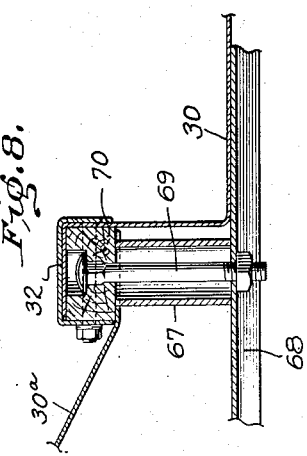
INVENTORS
Warren H. Farr,
Carolus L. Eksergian,
Clarence E. Dupont and
BY John P. Tarbox
ATTORNEY Aug. 2, 1949.                W. H. FARR ET AL                2,477,790
                              BELT CONVEYER
Filed Oct. 28, 1944                                   6 Sheets-Sheet 6
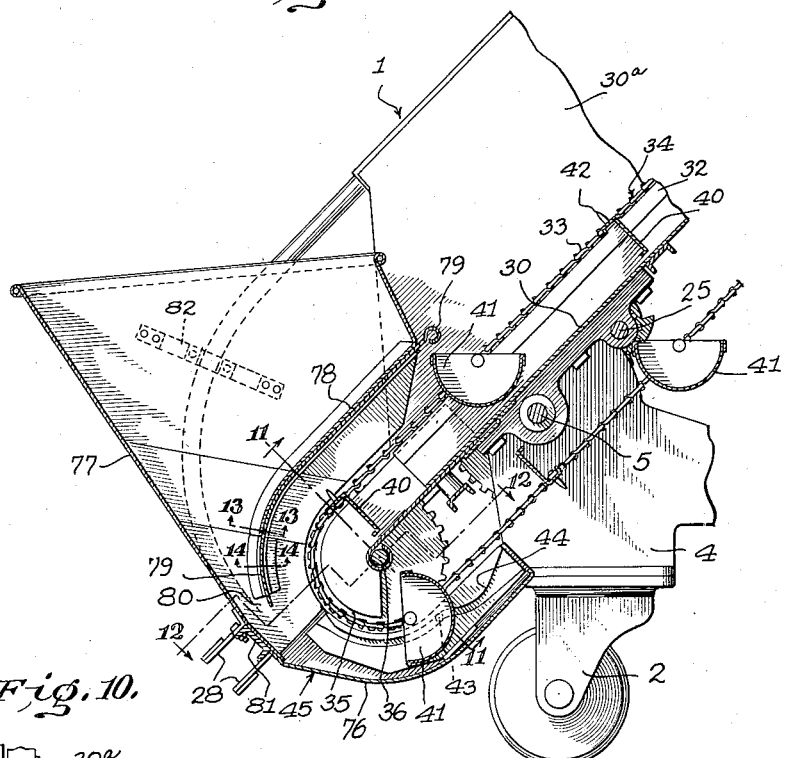
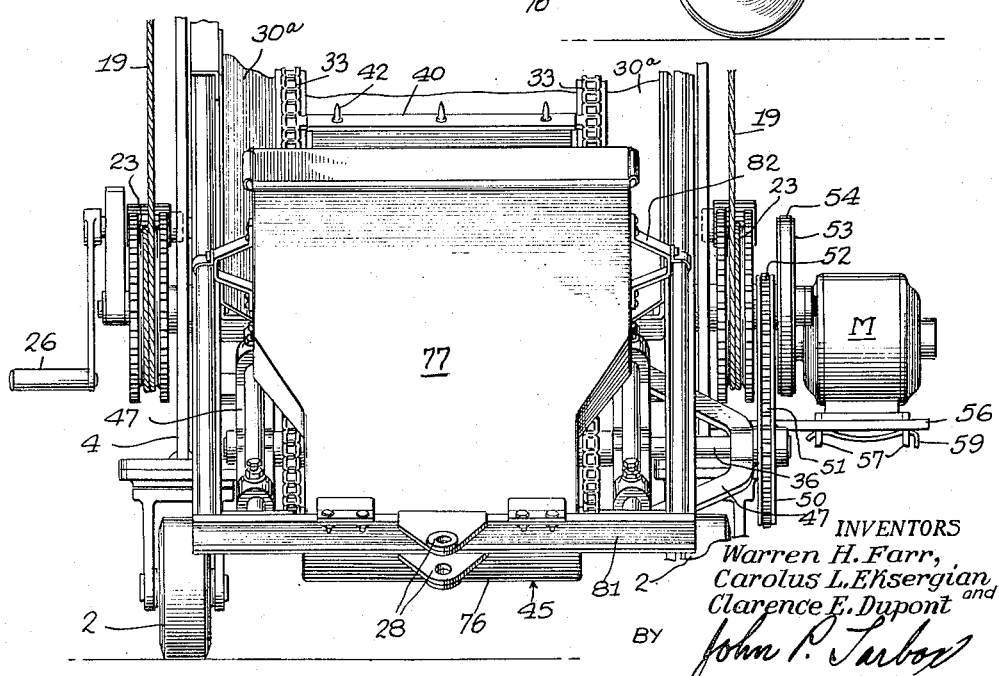
INVENTORS
Warren H. Farr,
Carolus L. Eksergian, and
Clarence E. Dupont
BY
John P. Tarbox
ATTORNEY Patented Aug. 2, 1949

2,477,790

UNITED STATES PATENT OFFICE 2,477,790

BELT CONVEYER

Warren H. Farr, Grosse Pointe Farms, and Carolus L. Eksergian and Clarence E. Dupont, Detroit, Mich., assignors to The Budd Company, Philadelphia, Pa., a corporation of Pennsylvania Application October 28, 1944, Serial No. 560,884

3 Claims. (Cl. 198—115)

This invention relates to belt conveyors and has for an object the provision of improvements in this art.

One of the particular objects is to provide a belt conveyor with adjustable jointed sections which maintain the continuity of movement of material past the joint.

Another object is to provide a jointed foldable single-belt conveyor which will keep the belt tight in any adjusted position.

The above-mentioned and other objects and advantages of the invention will be apparent from the following description of an exemplary embodiment thereof, reference being made to the accompanying drawings, wherein:

Figure 5 is a top plan view of the parts shown in Figure 3;

Figure 6 is a vertical longitudinal section through the entire conveyor with parts of the conveyor sections cut out to shorten the view;

Figure 7 is a vertical section taken on the line 7—7 of Figure 6;

Figure 8 is an enlarged transverse section taken on the line 8—8 of Figure 6;

Figure 9 is a vertical section through the lower end of the conveyor and a hopper secured thereon;

Figure 10 is a front end elevation of the assembly shown in Figure 9;

Figure 11 is a vertical transverse section taken on the line 11—11 of Figure 9;

Figure 12 is a longitudinal section taken on the line 12—12 of Figure 9;

Figure 13 is a partial transverse vertical section taken on the line 13—13 of Figure 9; and Figure 14 is a partial vertical section taken on the line 14—14 of Figure 9.

Figure 1:
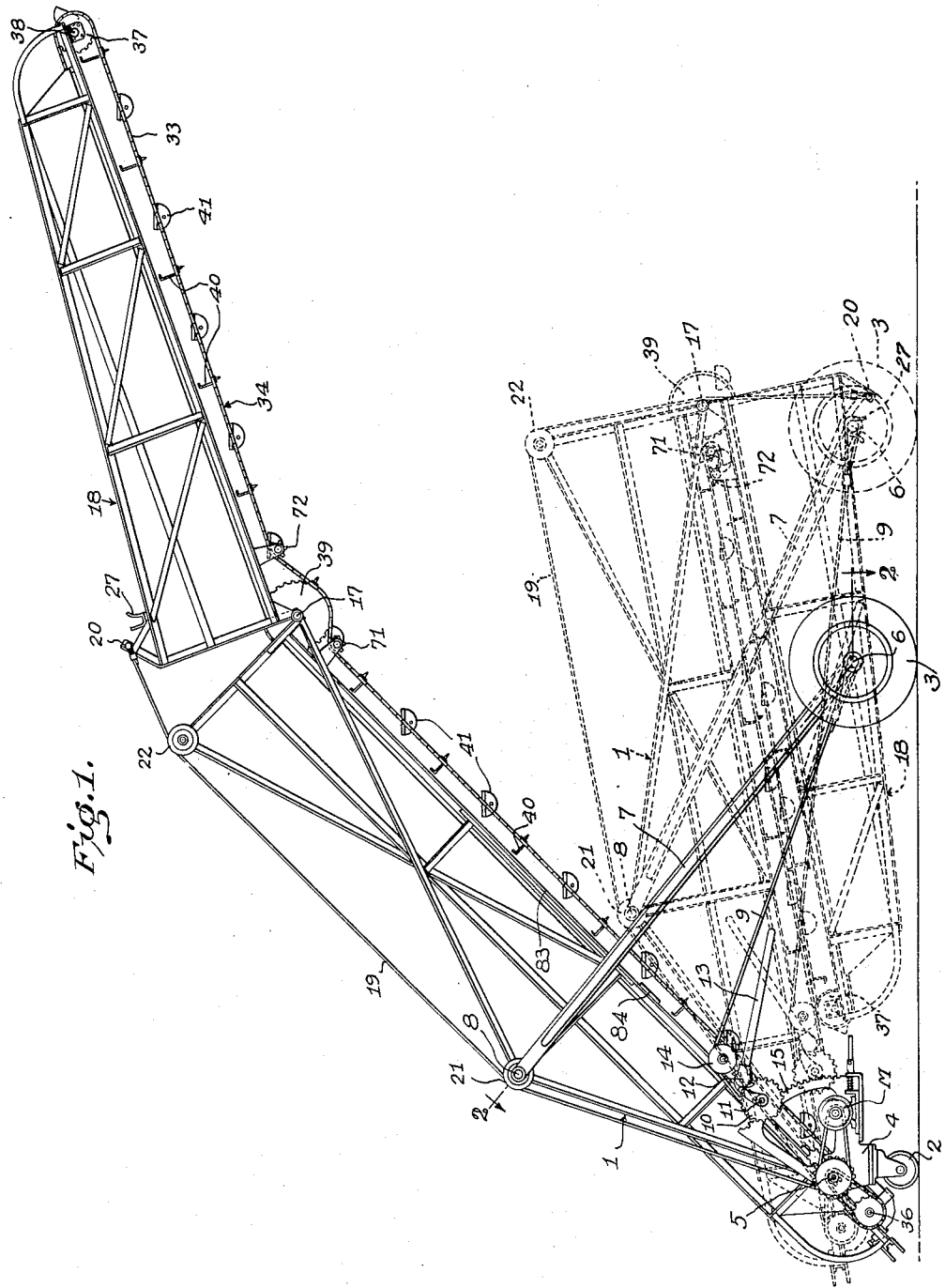
Figure 1 is a side elevation of a belt conveyor embodying the invention, showing the sections raised, in solid lines, and folded, in dotted lines.

The illustrated apparatus comprises a lower or main conveyor section 1 provided with caster wheels 2 at the front or lower end and wheels 3 at the rear end. The front wheels 2 are mounted on supports 4 which are pivoted to the frame of the section 1 on a horizontal shaft 5. The supports 4 may be made unitary by transverse elements if necessary. The rear wheels 3 are mounted on an axle 6 carried by long struts 7 which are pivoted at their upper ends on a shaft 8 to the sides of the frame of the section 1.

The rear wheels 3 can be moved forward or backward relative to the front wheels to raise and lower the upper end of the conveyor section 1, the relative movement of the wheels being accomplished by a pair of cables 9 which are attached at the rear end to the axle 6 and at the front end to drums 10 secured to a shaft 11 of a ratchet winch. Through suitable gearing the shaft 11 and drums 10 are turned by a ratchet shaft 12 provided with a handle 13. The cables 9 are guided to the drums 10 by sheaves 14.

The front wheel supports 4 are maintained in the correct position relative to the ground during the raising and lowering of the conveyor section 1 by any suitable means, the means illustrated comprising for each a curved rack 15 secured on the support concentric with the shaft 5 and a meshing gear 16 of suitable size carried on the shaft 11.

The conveyor section 1, the wheels 2 and 3, the supports 4, the struts 7 and the cables 9 thus form a vehicle which can be transported, as by a tractor, and used wherever needed. During transit the conveyor is preferably folded down on the rear axle to take all strains off the cables.

To the upper end of the lower section 1 there is hinged, as by a shaft 17, an upper conveyor belt section 18. The upper section 18 is arranged to be raised and lowered by cables 19 which are attached by bolts 20 to the section frame at a distance from the hinge axis. The cables 19 pass over sheaves 21, 22 on the frame of the lower section and are attached to drums 23 which are mounted for free rotation on the shaft 5. The drums 23 are geared to pinions 24 on a ratchet shaft 25 operated by a crank handle 26.

The upper section 18 swings around beneath the lower section 1 when not in use and is securely latched in the folded position by suitable latch means, not shown. The upper section is provided with forks 27 which in the folded and lowered position, as shown in dotted lines in Figure 1, are adapted to embrace and rest upon the axle 6. This takes the load off cables 9. The lower section 1 must be raised sufficiently to permit the end of section 18 to swing above the axle 6 when the upper section is folded or unfolded. The upper section may be pushed against the lower section by hand to latch. When released, it swings away by gravity to a position where the cables 19 are effective for raising and lowering it. In the folded condition the conveyor is adapted to be transported, as by a hitch 28 on the frame of the lower section 1, the hitch being attached to a tractor or any suitable towing means.

The conveyor sections are provided each with a sheet metal trough 30 and at the joint between sections the troughs are joined by an arcuate trough element 31. The trough element 31 is concentric with the hinge shaft 17, is carried by the trough of one section (here the upper), and has a close turning fit with the trough of the other section.

Rails 32 on the sides of the troughs support the upper reaches of the side chain belt loops 33 of a conveyor belt 34. The belt 34 extends the full length of both conveyor sections 1 and 18, passing over sprockets 35 on a shaft 36 at the lower end of the lower section, over sprockets 37 on a shaft 38 at the upper end of the upper section, and intermediately over sprockets 39 on the hinge shaft 17 between the sections.

The conveyor belt 34 includes flights or transverse elements which move material up the troughs 30. The flights may be of any desired type suited for the material to be handled. Here plate flights 40, bucket flights 41 and spikes 42 are illustrated. The plates and buckets are adapted to raise granular material and the spikes are adapted to raise bulk or baled material. The plates or buckets are more or less equivalents of each other and either alone might be used. The plates have the more general use and if they fit the sides of the trough closely, with flexible edges preferably, they can raise fine material such as grain, sand and the like. The spikes 42 may be of any height desired, depending on the type of material to be handled.

When the buckets 41 are used they may be provided with cam pins 43 at one or both ends, which pins cooperate with a cam 44 at the lower end to cause the buckets to scoop material from a feed hopper 45 and with a cam 46 at the upper end to cause the buckets to discharge material.

The trough 30 may be supplemented by extension plates 30a on the sides for retaining bulk material such as hay, loose or baled.

The lower sprocket shaft 36 is mounted on slide frames 47 adjusted on rods 48 to tighten the conveyor belt. Set screws 49 hold the frames 47 in adjusted positions along the rods 48. The trough 30 is jointed, as shown in Figures 5, 6, 9 and 11 to change length, as required.

The conveyor belt is driven by a motor M of any suitable character through appropriate drive connections. The connections here shown comprise a sprocket 50 on shaft 36 driven by a chain belt 51 from a sprocket 52 carried fast with a pulley 53 which is rotatably mounted on the shaft 5 on which the conveyor section 1 is hinged. A V-belt 54 drives the pulley 53 from the motor pulley 55.

The motor M is adjustably mounted upon a plate 56 carried by a support 4, whereby the belt 54 may be tightened or slacked to drive the conveyor belt at will. Specifically, the motor M is provided with projections 57 which extend through slots 58 in the plate, the projections being held down by retainers 59 passed through holes in the projections beneath the plate. Between upstanding lugs 60 and 61 on the motor base and plate respectively adjusting means are provided, the means here shown comprising a spring 62 urging the lugs apart to slack the belt 54 and a cam 63 for moving the lugs together to tighten the belt. The cam 63 is carried by an arm 64 pivoted by a pin 65 to a rod 66 which is attached to the lug 60 and passes through a guide hole in the lug 61.

As shown in Figure 8, the rails 32 for the conveyor chains are supported by sleeves 67 upon cross members 68 of the section frames. The rails are held down by bolts 69. The heads of the bolts are concealed by a wooden core strip 70 upon which the metal portion of the rail is secured.

Means are provided for keeping the conveyor belt 34 at approximately uniform tension throughout all movements of the upper section 18 relative to the lower section 1, the means herein shown comprising idler sprockets 71 and 72 mounted beneath the conveyor sections 1 and 18 respectively near the hinge shaft 17. The sprockets 71 are mounted nearer the axis of shaft 17 than sprockets 72 and when the conveyor sections are fully folded, as shown in dotted lines in Figure 1, the lower reach of the conveyor belt is folded back over the sprockets 71, the sprockets 72 being disposed within the bend thus formed. In the partially and fully open positions the lower reach of the conveyor belt meshes with the lower side of the sprockets 39. As the sections are folded the upper reach of the conveyor belt folds more and more around the sprockets 39 and this takes up any slack which tends to form in the lower reach of the belt.

Means are provided for turning the rear wheels 3 relative to their axle 6 and locking them in any turned position, the means here provided including a king pin 73 between the axle and the wheel spindle and a sector 74 carried by the wheel spindle which is secured in adjusted positions to the axle by a pin 75 entering one of a number of holes in the sector. The wheels may be turned into longitudinal alignment, as for transporting the conveyor; or may both be turned in parallel at an angle, as for moving the rear end of the conveyor sidewise; or may be moved at opposite angles for preventing movement in any direction.

The hopper 45 includes a trough 76 of arcuate shape disposed beneath the lower conveyor belt shaft 36, through which the buckets 41 are adapted to pass to pick up material. The hopper also includes an open-topped funnel-like box 77 into which material is charged, the box having a floor-like partition 78 provided with a valve plate 79 to regulate the size of the opening 80 through which material flows to the conveyor belt. The hopper is preferably formed in two or more parts, here in two parts comprising a trough 76 and the feed box 77, both mounted on the heavy front cross bar 81 and other parts of the section frame 1. The box 77 is shown to have side brackets 82 attached to another portion of the section frame.

Figure 2:
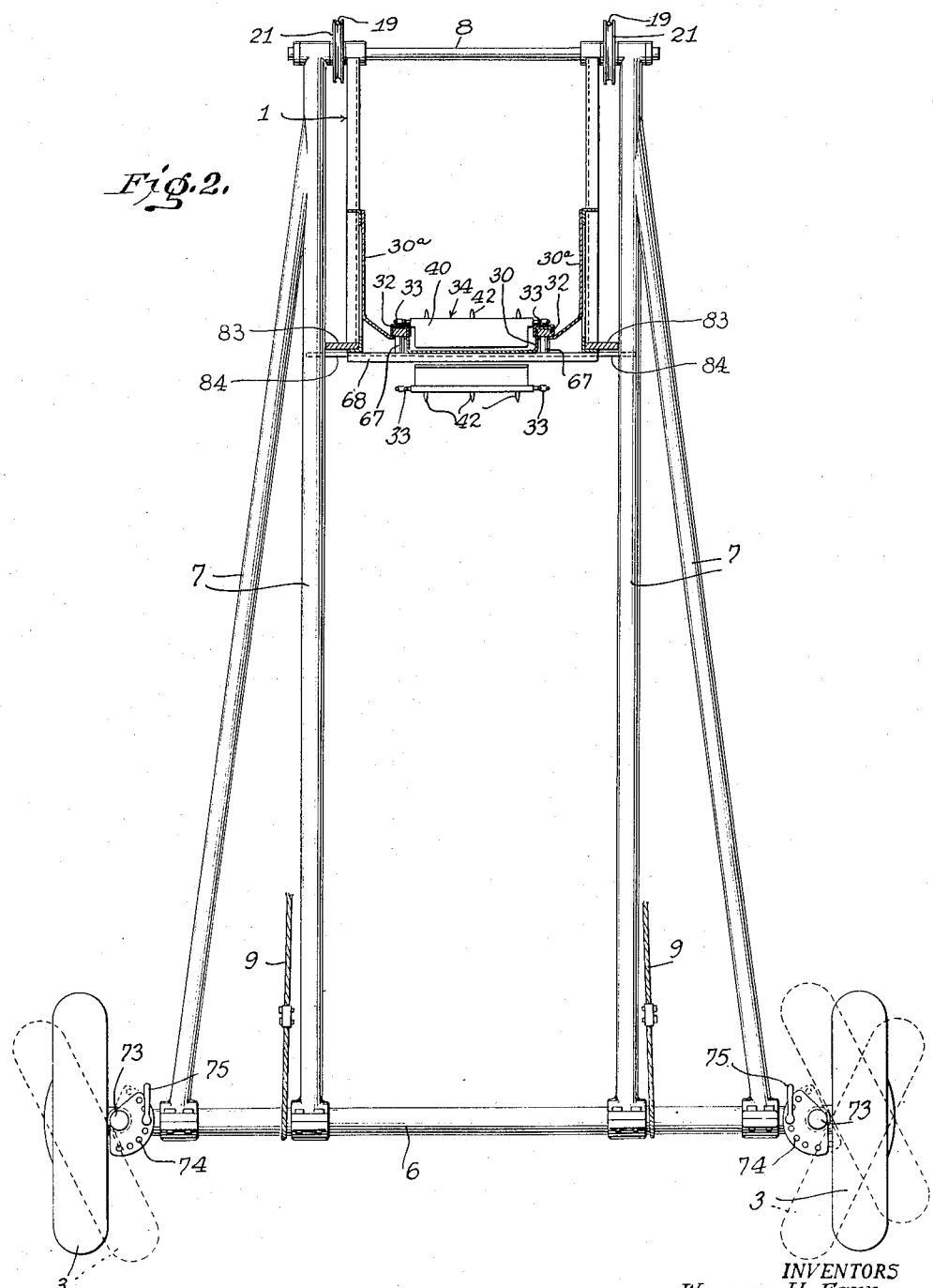
Figure 2 is an inclined section taken on the line 2—2 of Figure 1.
Figure 3:
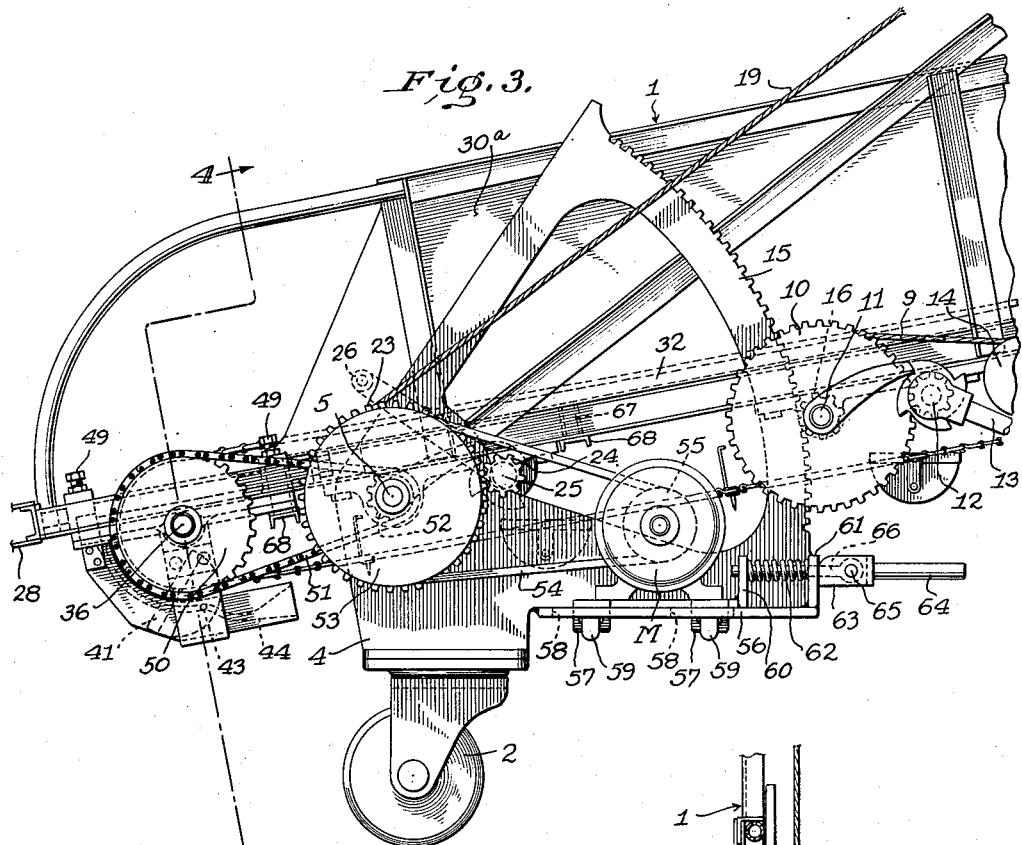
Figure 3 is a partial enlarged side elevation of parts shown at the left side of Figure 1.
Figure 4:
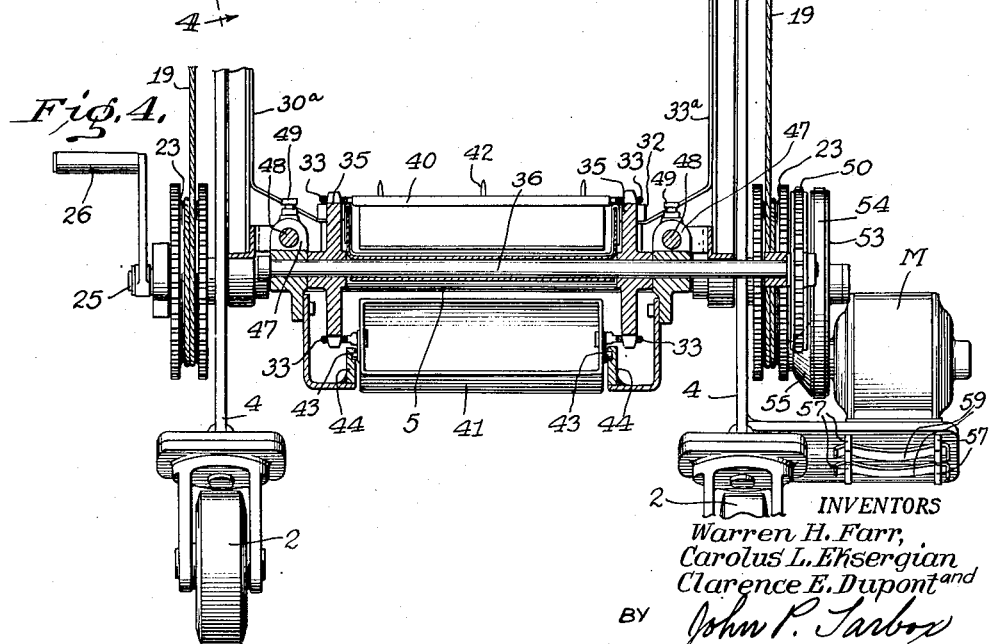
Figure 4 is a vertical section taken on the line 4—4 of Figure 3.

As shown in Figures 1 and 2, the lower section 1 is provided on each side with a guide 83, which guides engage the sides of parallel struts 7 to prevent swaying. Stops 84 are provided to limit the raising of the lower section to say about 55 degrees and also prevent undue shortening of the wheel base.

It is thus seen that the invention provides very simple and effective means for elevating material, for raising the lower conveyor section about a tiltable support without tilting the support, for raising and lowering an upper conveyor section independently of the movement of the lower section and for moving the lower section without changing the position of the upper section relative thereto, for hinging the upper section on the lower without changing the elevation by changing the wheel base, for changing the position of the mounting wheels for different needs, and for effectively feeding material to the conveyor in regulated amounts.

While one embodiment of the invention has been illustrated by way of example, it is to be understood that there may be various embodiments within the limits of the prior art and the scope of the subjoined claims.

What is claimed is:

1. A belt conveyor comprising in combination, a first conveyor section, a second conveyor section hinged to one end of the first section, a belt guide pulley mounted on the hinge axis between sections, a conveyor belt passing along the conveying surface of said sections and over said pulley, and returning on the opposite side of the pulley, and belt guide elements on each of said sections near the hinge line and located on the said opposite side of the pulley, the guide elements being located at different distances from the hinge line measured along the length of the sections such that one passes the other when the sections are folded together toward the return side of the belt, and said elements being so constructed and arranged as to cause the belt to wrap therearound as the sections are folded together.

2. A belt conveyor comprising in combination, a first conveyor section, a second conveyor section hinged to one end of the first section, a belt guide pulley mounted on the hinge axis between sections, a conveyor belt passing along the conveying surface of both of said sections and over said pulley and returning on the opposite side of the hinge pulley, and belt guide elements located on the said opposite side of the pulley, one of said guide elements being mounted on each of said sections at a distance from the hinge line measured along the length of the sections, and said elements being so constructed and arranged as to cause the belt to wrap therearound as one section is swung relative to the other about the hinge line, said guide elements being so located and arranged as to place the return portion of the conveyor belt in engagement with the said opposite side of said pulley when the said sections are in alignment and to remove the belt from the said opposite side of the pulley when the sections are folded together.

3. A belt conveyor comprising in combination, a first conveyor section, a second conveyor section hinged to one end of the first section, a belt guide pulley mounted on the hinge axis between sections, a conveyor belt passing along the conveying surface of both of said sections and over said pulley and returning on the opposite side of the hinge pulley, and belt guide elements located on the said opposite side of the pulley, one of said guide elements being mounted on each of said sections at a distance from the hinge line measured along the length of the sections, and said elements being so constructed and arranged as to cause the belt to wrap therearound as one section is swung relative to the other about the hinge line, said guide elements being formed as idler pulleys and being located nearer to the said axis than the said opposite side of said hinge pulley to cause the return portion of said belt to engage the said opposite side of said hinge pulley when the sections are in alignment and to remove the return portion of the belt from the hinge pulley and to carry it on the idler guide pulleys when the sections are folded together.

WARREN H. FARR.
CAROLUS L. EKSERGIAN.
CLARENCE E. DUPONT.

REFERENCES CITED

The following references are of record in the file of this patent:

UNITED STATES PATENTS

| Number | Name | Date |
|---|---|---|
| 406,788 | Sprague | July 9, 1889 |
| 748,481 | Coffin et al. | Dec. 29, 1903 |
| 785,241 | Ulrich | Mar. 21, 1905 |
| 793,557 | Adams | June 27, 1905 |
| 897,134 | Parker | Aug. 25, 1908 |
| 997,868 | Steele | July 11, 1911 |
| 1,106,632 | DeMoure | Aug. 11, 1914 |
| 1,471,763 | Wentz | Oct. 23, 1923 |
| 1,589,091 | Barber | June 15, 1926 |
| 2,105,610 | O'Brien | Jan. 18, 1938 |
| 2,266,673 | Becker | Dec. 16, 1941 |